United States Patent [19]

Kaseta et al.

[11] 4,200,894
[45] Apr. 29, 1980

[54] HEAD ADJUSTMENT MECHANISM FOR RIGID MAGNETIC DISC MEMORY APPARATUS

[75] Inventors: Robert Kaseta, Stow; Lenn Daugherty, Northboro; Sigmund Hinlein; Michael Feldstein, both of Sudbury; Harold Thackaberry, Franklin, all of Mass.

[73] Assignee: Data General Corporation, Westboro, Mass.

[21] Appl. No.: 899,045

[22] Filed: Apr. 24, 1978

[51] Int. Cl.² .......................... G11B 5/54; G11B 5/48; G11B 5/6; G11B 21/24
[52] U.S. Cl. ..................................... 360/106; 360/97; 360/105
[58] Field of Search ................................ 360/97–99, 360/103–106, 109; 346/137; 310/49 R

[56] References Cited

U.S. PATENT DOCUMENTS

| | | | |
|---|---|---|---|
| 2,530,584 | 11/1950 | Pontius | 360/109 |
| 3,199,092 | 8/1965 | Hoffman | 360/106 |
| 3,500,363 | 3/1970 | Shill | 360/97 |
| 3,609,721 | 9/1971 | Meneley | 360/97 |
| 3,859,662 | 1/1975 | Habich et al. | 360/106 |
| 3,864,749 | 2/1975 | Stansell | 360/105 |
| 3,946,439 | 3/1976 | Castrodale et al. | 360/99 |
| 4,071,866 | 1/1978 | Butsch | 360/106 |
| 4,123,675 | 10/1978 | Moskowitz et al. | 310/49 R |

OTHER PUBLICATIONS

B. C. Kuo, Theory and Applications of Step Motors, West Publishing Co., pp. 187–189, 1974.

*Primary Examiner*—Alfred H. Eddleman
*Attorney, Agent, or Firm*—Joel Wall; Jacob Frank

[57] ABSTRACT

An open loop, stepper-motor-driven, rigid magnetic disc memory apparatus for use with a data processing system. A rigid magnetic disc with high track density is driven by a stepper motor in an open-loop fashion or without servomechanism control. The memory apparatus includes: band structure including a spring bias for coupling stepper motor drive to apparatus supporting magnetic heads above and/or below the spinning disc and for temperature compensating for disc/apparatus expansion and contraction; manually operable control for zeroing the magnetic heads, moving and locking them in the disc's landing zone as, for example, while in transit, and providing a travel limit to head movement when the memory apparatus is operating; keying apparatus for preventing erroneous insertion and mis-alignment of and damage to an optical transducer relative to an optical mask arranged to spin with the disc structure; shim apparatus for precisely positioning the magnetic heads in the spin axis direction; viscously-coupled inertia apparatus for damping the stepping motor's step-rotary motion; a device for employing spinning motion associated with the disc for cooling purposes; and other structure.

9 Claims, 14 Drawing Figures

HEAD ADJUSTMENT MECHANISM FOR RIGID MAGNETIC DISC MEMORY APPARATUS

CROSS-REFERENCE TO RELATED APPLICATIONS

This application relates to other applications filed concurrently herewith, all being assigned to a common assignee, Data General Corporation. Serial numbers and filing dates for all related applications are as follows:

| Serial No. | Filing Date |
|---|---|
| 899,043 | 4/24/78 |
| 899,044 | 4/24/78 |
| 899,046 | 4/24/78 |
| 899,047 | 4/24/78 |
| 899,048 | 4/24/78 |
| 899,941 | 4/25/78 |
| 899,942 | 4/25/78 |
| 899,944 | 4/25/78 |

BACKGROUND OF THE INVENTION

1. Field of the Invention

The present invention may relate generally to memory apparatus for use in a data processing system and particularly to open loop control of stepper motor drive of rigid disc memory apparatus having special mechanical control and cooling features.

2. Description of Prior Art

In the prior art, rigid magnetic discs for use with data processing systems as digital information memory devices have generally been driven by motors under servomechanism or closed-loop control. These motors, which were used for positioning the apparatus that supports the magnetic heads for writing information onto and reading information from the disk, were usually linear (voice-coil) type motors. Rotary type motors may have been used, but if so, they were not stepping (or stepper) motors as far as is known.

But, stepping motors had been used with non-rigid, or "floppy", or flexible disc media, as for example, disclosed in U.S. Pat. No. 4,071,866 which discloses a lead-screw arrangement for coupling step rotation of the stepping motor to apparatus which supports the magnetic heads. Floppy discs are less expensive than rigid discs, but they have shortcomings which include relatively poor reliability and short life, since the magnetic heads are in contact with the surface of the floppy discs! By contrast, rigid magnetic discs do not contact the magnetic heads which "fly" on an air bearing relative to the disc surface.

Another problem associated with floppy discs is that they cannot store nearly as much binary information as can a rigid disc. One reason for this limited capacity is that floppy discs usually have a substantially lower track density (density of concentric rings or tracks which can be allocated as concentric areas on the surface of this disc to retain binary information) than do the rigid magnetic discs. While this is a disadvantage of floppy discs, a concomitant advantage of floppy discs is that because of its lower track density, its magnetic head actuator is sufficiently accurate without closed-loop control. The avoidance of this extra closed-loop or servomechanism technology (mechanical, electronic, and electromechanical) provides a substantial reduction in cost, complexity, etc. On the other hand, although rigid magnetic discs can store substantially more binary information than floppy disc, since track density in rigid discs can be much greater, actuators of rigid disc magnetic heads ususally required closed loop and servomechanism control with its accompanying higher cost, complexity, etc.

However, there have been designs in the prior art which have approached but not achieved an open-loop system for rigid discs. In the early 1960's, IBM developed a rigid disc system which employed a d.c. motor and a mechanical, ratchet-type, detent control. There was feedback involved, although the type of control may not be necessarily characterized as closed-loop control. It suffered from low track density capacity, mechanical wear, poor reliability, and other problems. This older technology employed "straddle-erase" magnetic heads, which were used to provide clear separation between concentric magnetic rings of binary information, by using erase heads on both sides of (in the radial direction, and thus straddling) the read/write head. This "gap-insurance" was necessary in the older technology since head position control (and possibly even with servocontrol) was not that good.

Straddle erase heads are not readily available today in "Winchester" technology (a lubricated, rigid magnetic disc, with lightly loaded heads in a sealed environment), which the present invention employs. Although the present invention uses open loop control with high track density discs, it is still sufficiently advanced in its control design to avoid need for straddle erase heads (which, as noted, are not readily available anyway).

A substantial advance in the technology of computer disc memories has been achieved by the present invention. Higher reliability and greater storage capacity characteristics of rigid magnetic discs are now combined with the lower cost and less complex characteristics of an open loop disc drive. The present invention, which is operating successfully, thus combines the best of both "worlds" and is therefore a solution to these above-noted shortcomings of the prior art.

In the prior art, there is a mechanical control extending outward from the Winchester technology sealed enclosure permitting the locking of the magnetic heads upon the "landing zone" position of the disc, an uncritical area where information is not intended to be stored. Zero alignment normally takes place at the factory, and was usually accomplished by separate control. The present invention provides a convenient improvement to this zeroing procedure by permitting the same "landing zone" lock to function in the same position as a zeroing control which provides a zero track reference, and in another position establishes a safety travel-limit for movement of the magnetic head support arm during operation of the disc drive.

Other prior art frustrations related to precise adjustments of the heads above and below the surface of this disc, since, as noted, magnetic heads during operation or spinning of the disc fly on an air bearing developed by relative motion of heads and ambient air. In the past, precision machining of the multiple pieced supporting structure was required to provide the precise (about 0.02 inches) tolerance required. The present invention provides a solution to this prior art precision machining problem by employing shim or spacer apparatus to permit adjustment of heads relative to disk surface.

Another prior art concern related to mis-alignment or erroneous orientation of sensing transducers such as an optical transducer employed in the memory apparatus when the memory apparatus was being fabricated. In the optical transducer situation, the spinning magnetic disc structure could include an optical mask spinning therewith, and with a toothed or apertured periphery for purposes of permitting and preventing optical communication in the coupled optical transducer. The transducer counts the teeth and thereby generates information indicative of angular speed and displacement of the spinning shaft. In certain prior art memory apparatus constructions, alignment of optical heads with the optical mask and potential damage to them was a critical problem because of the high density of mechanical parts in close proximity to the location in which the optical transducer would be positioned. Accordingly, the present invention is a solution to this problem of the prior art by providing special keying means for allowing only the unique and proper insertion, mounting, and orientation of the optical transducer.

Yet another problem of the prior art, and a problem which is associated not only with this memory technology, but with virtually all electro-mechanical apparatus, is the removal of heat which has been generated by operation of the electrical and mechanical components of the apparatus. Normally, a separate mechanism such as a separate fan is included somewhere within the housing of the apparatus to create a draft or flow of air which provides the necessary heat transfer and stabilization of temperatures within the apparatus housing. But, this additional fan requires additional space, additional cost, additional power, and generates additional heat which is the precise problem it is trying to compensate. Accordingly, the present invention is an improvement in this area of temperature control by making use of rotary or pivotable motion already present for other purposes and synergistically providing a cooling effect without addition of separately powered fan apparatus.

The foregoing and other problems of the prior art are attended to by solutions described and embodied herein, as will be elaborated on hereinbelow.

SUMMARY OF THE INVENTION

The present invention relates to memory apparatus for use in a digital computer system, the memory apparatus employing a non-flexible magnetic disk for storing the binary information and apparatus for positioning magnetic heads adjacent and parallel to the plane of disk.

The positioning apparatus includes supporting structure which is movably mounted to the base of the apparatus to support the magnetic heads. The supporting structure is movable in directions parallel to and perpendicular to the plane of the disk. Shim structure is provided to displace the supporting structure in the direction perpendicular to the plane of the disk, to adjust the adjacent relationship between the magnetic heads and the disk.

It is advantageous to employ features of the present invention in a disk memory for use with a data processing system since the use of shim apparatus avoids the necessity of high precision machining of certain structural parts prior to assembly. Since the distance from the magnetic heads to the surface of the disk is small and very critical where the magnetic heads normally "fly" above and/or below the surface of the disk, the precise machining of these structural parts can be a problem; this problem is avoided by use of the present invention.

It is thus an object of the present invention to provide an improved disk memory system for use in a data processing system.

It is another object of the present invention to provide an adjustment technique for controlling the distance from the magnetic heads to the surface of the disk, without requiring precision machining of certain structural parts.

Other objects and advantages of the present invention will be understood after referring to the detailed description of the preferred embodiments and to the appended drawings wherein:

DESCRIPTION OF THE PREFERRED EMBODIMENTS

Figure 1:
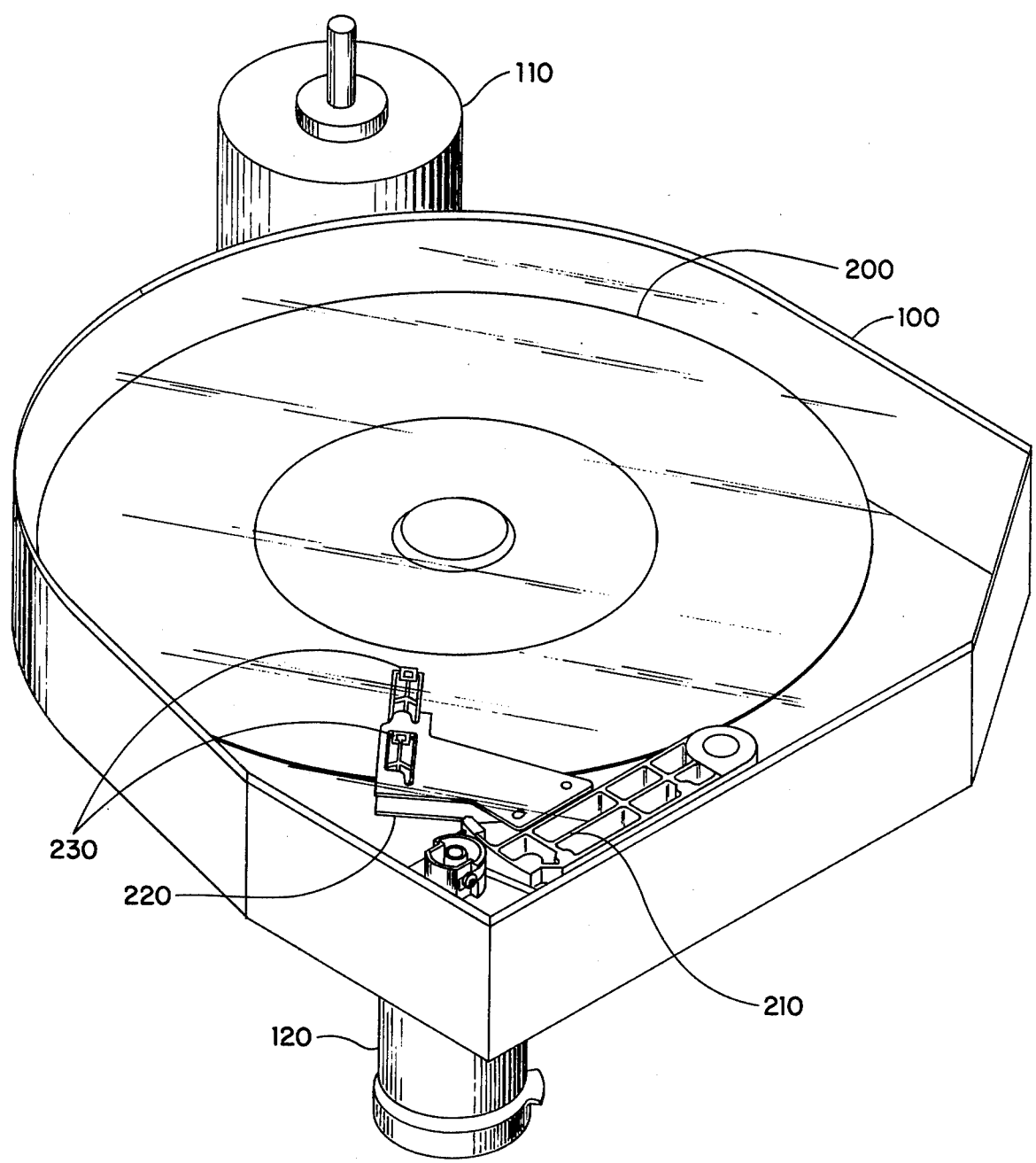
FIG. 1 is a perspective view of the magnetic disc memory apparatus.

Referring to FIG. 1, a perspective view of the rigid magnetic disc and its enclosure is presented. This apparatus can be characterized as "Winchester technology" since it employs a sealed, non-removable, lightly-loaded head, for a lubricated rigid disc. The enclosure is in communication with the ambient atmosphere through an air filter (not shown). The enclosure is necessary to maintain a relatively controllable ambient atmosphere for the spinning magnetic disc and the magnetic heads flying on an air bearing relative to the disc. Housing or base 100 provides this required seal; constant speed motor 110 drives disc 200 which will thus spin about its spin axis; and, stepping motor apparatus 120 provides step rotational motion to pivotable arm 210 and carriage arm 220 so that magnetic heads 230 can be curvilinearly displaced in a plane parallel to the surface of disc 200.

Figure 2:
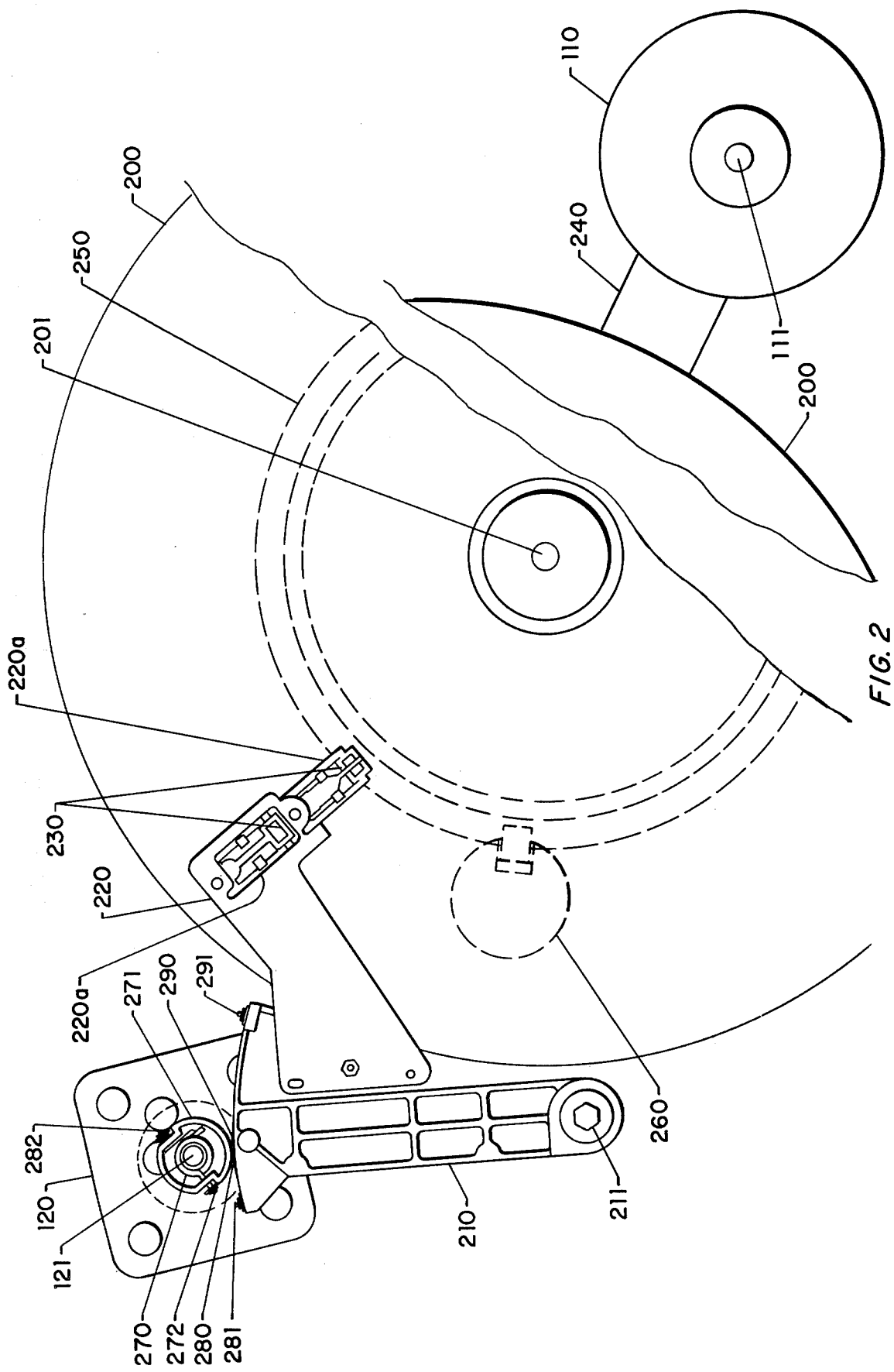
FIG. 2 is a schematic illustration of the magnetic disc memory apparatus of FIG. 1.

Referring to FIG. 2, magnetic disc 200, which is a rigid and not a "floppy" disc, is pivotably mounted about axis or shaft 201, which shaft is driven by constant speed motor 110. Constant speed motor 110 is rotatably or pivotably mounted around shaft or axis 111, (the housing of the motor being fixedly mounted to the base and the motor shaft being rotatably or pivotably mounted therein), axis 111 and axis 201 being substantially parallel. Belt 240 is connected from shaft 111 to shaft 201 thereby providing drive from motor 110 to disc apparatus 200.

Figure 10C:
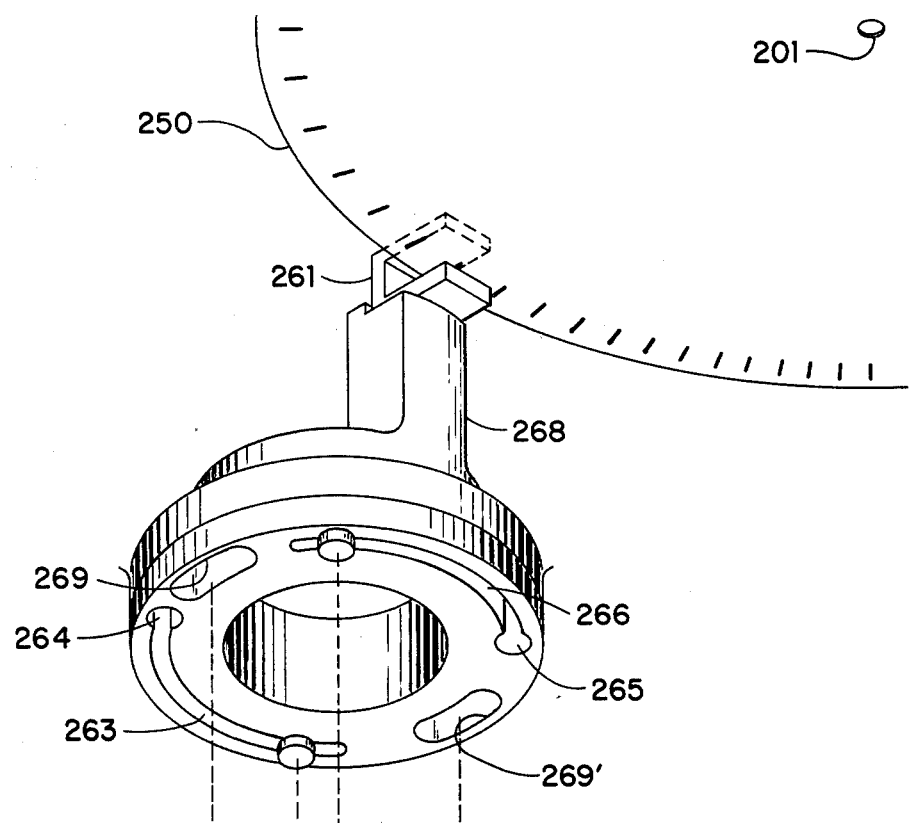
FIG. 10a, FIG. 10b, and FIG. 10c show an optical transducer system employed in the memory apparatus described herein and the arrangement by which its orientation during mounting and assembly is constrained to be accurate.
Figure 10B:
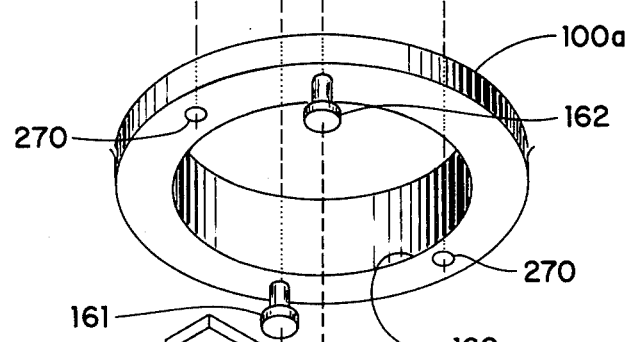
Figure 10A:
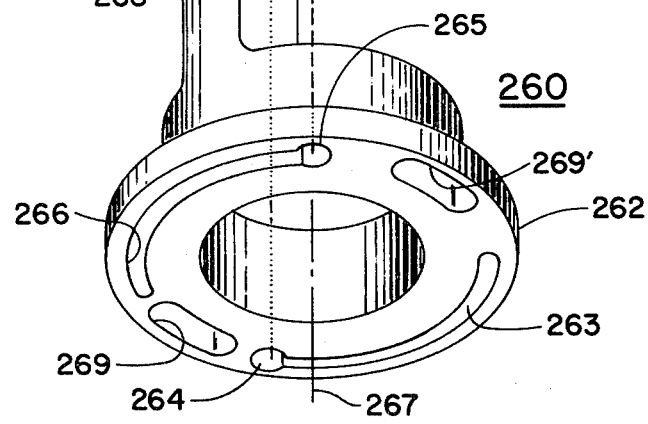

Circular dashed line 250 represents a toothed-periphery of an optical mask rotatably mounted with disc 200 about shaft 201 (and hidden from view in this figure). Optical transducer structure or system 260 is shown adjacent optical mask 250, whereby optical communication within the sending and receiving devices of optical transducer 260 is permitted and prevented by passage of the toothed periphery between such devices. Further detail of optical transducer system 260 is shown in FIG. 10a, 10b, and 10c to be further described hereinbelow.

Pivotable arm 210 pivots about axis 211, motion of pivot arm 210 thus being parallel to the surface of rigid disc 200. Extending from or cantilevered from pivotable arm 210 is carriage arm 220 which supports magnetic heads 230. Essentially congruent structure hidden from view by carriage arm 220 and disc 200 is another carriage arm supporting two other magnetic heads (thus not shown). As disc 200 spins about axis 201, magnetic heads 230 and those on the opposite side of the disc as well ride on an air bearing created by draft of the spinning disc, thus there is no physical contact between magnetic heads 230 and disc 200 when disc 200 is spinning. This air bearing is in the neighborhood of 19 microinches. Because of pivotable motion about pivot axis 211, magnetic heads 230 are curvilinearly displaced in a plane parallel to the plane of rigid disc 200.

Pivotable arm 210 is made to pivot about pivotable axis 211 which is substantially parallel to axis 201, by the driving force of stepper motor 120 which is pivotably or rotatably mounted to the base of the memory apparatus (the housing of the motor being fixedly connected to the base of the memory apparatus and its shaft 121 being step-rotatable therein). Stepper motor 120 is shown in operative connection with pivotable arm 210 through coupling bands 280 and 290.

Figure 3:
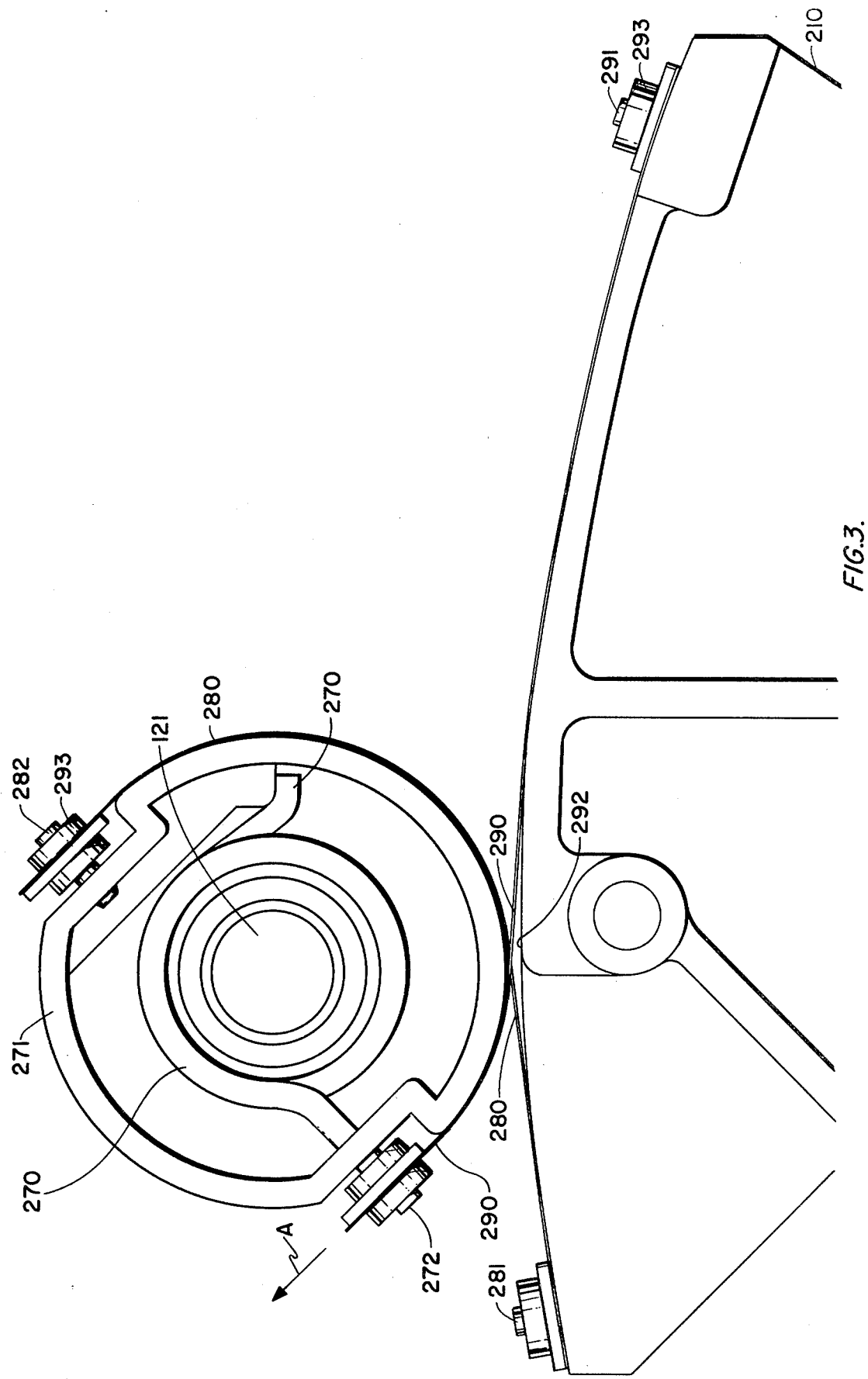
FIG. 3 is a detailed view of the pulley, coil spring, and metal band coupling arrangement of the magnetic disc memory apparatus of FIG. 2.

Referring still to FIG. 2 and also to FIG. 3 where the detail is more readily seen in this larger view, bands, preferably metal bands, are apertured and mounted around fixedly connected bosses 281 and 291 respectively, these bosses or points being non-adjacent and along the surface of the portion of the pivotable arm opposite from axis 211. The holes in the bands are larger than the bosses to permit some play or movement. Rubber or pliable grommets or washers 293 are press fit over their respective bosses as shown to provide proper spacings and anchorings.

In a specific embodiment, the surface 292 of pivotable arm 210 at the opposite end from pivot axis 211 is a portion of a circular rim. Metal band 280 and metal band 290 lie on the surface of this circular rim and cross or overlap without touching each other. Metal band 280 is similarly connected at its other end to pulley 271 at boss or point 282. Pulley 271 has a rim-like peripheral wall seen on end in FIG. 3, mounted around a disc like member lying in the plane of the drawing, which is mounted about shaft 121, the shaft of stepper motor 120. Thus when stepper motor 120 operates, shaft 121 step rotates in response thereto, and since pulley 271 is fixedly attached to shaft 121 and is mounted therearound, pulley 271 likewise step rotates. Coil spring 270 is mounted around shaft 121 and is fixedly connected at one end of the spring to pulley 271. The other end 272 of spring 270 protrudes through an aperture in the wall of pulley 271 in an unconstrained manner, and is adapted to receive the aperture at the other end of metal band 290. In other words, the aperture at the other end of metal band 290 is similarly attached to protruding end 272 of coil spring 270, in a manner that permits some play or movement. The attachments need not have this play or movement, and could have been fixed attachments, but the apertures being larger than the bosses do permit automatic accommodation to some unwanted but unavoidable motions that might occur.

If the bias on spring 270 is in that predetermined "A" direction to cause tension upon metal band 290 pulling against fixed stop 291, then due to the transmission of force through pivotable arm 210, the fixed stop 281 will pull against metal band 280 which thus pulls against fixed stop 282. Accordingly, the dynamics and equilibrium of the configuration show that a taut condition is continually applied to both metal bands, which metal bands are chosen to be both flexible, but substantially inelastic in the taut biased directions.

In the preferred embodiment, these metal bands are constructed from ELGILOY ® alloy, the wall surface of pulley 271 almost circular, and the surface of 292 an arc of a larger-diameter circle. The flexible bands are thus constrained in a manner so that almost half of their total surface area is always in contact with one and the other circular support surfaces. Because of this continually taut but non-longitudinally flexible configuration, step rotation is accomplished with virtually no hysteresis and almost total repeatability. (By no hysteresis, it is meant that: if each step of the stepper motor could be conceived as being comprised of successive infinitesmal increments, then each successive increment of stepper motor shaft motion is instantaneously converted into a corresponding successive infinitesmal increment of motion of the pivotable arm.)

Another feature of this preferred embodiment is built-in temperature compensation. Normally, the magnetic disc is constructed from a metal such as aluminum. The carriage arm is also constructed from metal, and flexure 220a which holds the magnetic heads may be constructed from steel. Therefore, as ambient temperature changes, for example increases, the disc radial dimension and the radial dimension of flexure 220a both increase, and in the case of this configuration in opposite directions that accentuate the magnetic head offset which occurs. Spring 270 and bands 280 and 290 also expand with temperature increases. Therefore spring 270 is intentionally oriented so that its protruding end 272 pulls against the bands in that direction that will cause the magnetic heads to have minimal offset as temperature changes, thus providing temperature compensation; (the steel band expansion and contraction will tend to pull the heads in an outward generally radial direction as temperature increases and will tend to displace the heads in an inward generally radial direction toward the disc's axis 201 as temperature decreases).

Figure 4:
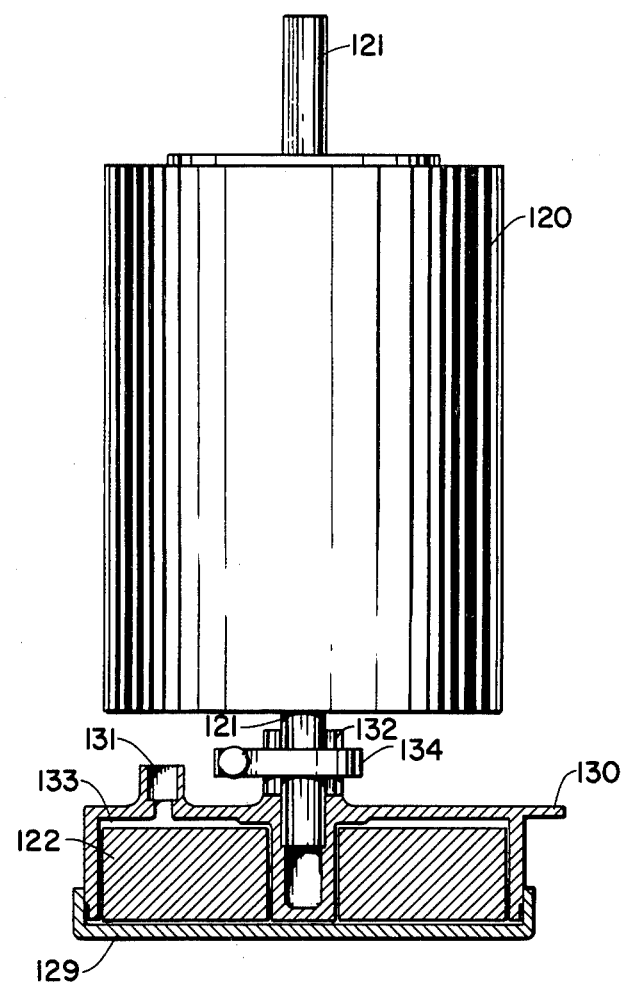
FIG. 4 is a schematic illustration of the stepping motor showing viscous inertia damping apparatus attached thereto.
Figure 5:
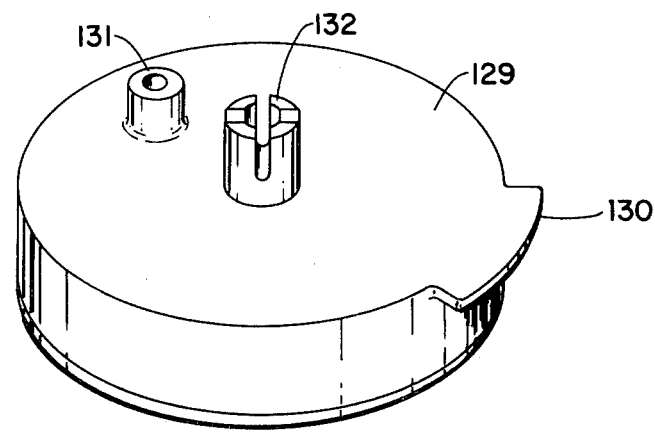
FIG. 5 is another view of the viscous inertial damper of FIG. 4.

Referring next to FIGS. 4 and 5, stepper motor 120 is shown in outline form and in the preferred embodiment is a Superior Electric type MO62 motor. Shaft 121 of stepper motor 120 connects to viscously-coupled inertia damper 129. Slug or fly wheel 122 is shown in dotted line construction internal to the housing or enclosure of the damper. There is also viscous fluid 133 such as silicone internal to the damper housing. The enclosure containing the slug is evacuated through aperture 131, through which the silicone or other viscous fluid is thereafter injected. There is a rigid connection between shaft 121 and the damper housing, by way of clamping structure 132 and 134, where slug or flywheel 122 is arranged to be free to rotate about shaft 121 within the damper enclosure. For angular accelerations, such as those which occur when the stepper motor starts and stops, there is relative movement between the flywheel and viscous media, thus providing the desired damping. But for constant velocity motions, the viscous media and flywheel move together, the relative motion therebetween then being zero, and the net damping affect upon motion characteristics of the stepper motor then being minimal. Protuberance 130 is an optical mask or tab which is employed in conjunction with an optical transducer (not shown) used as a "home switch". This is a switch which is activated or deactivated when the damper housing is returned to a reference position, and will be discussed more fully hereinbelow. This type of damper is commercially available.

Figure 6:
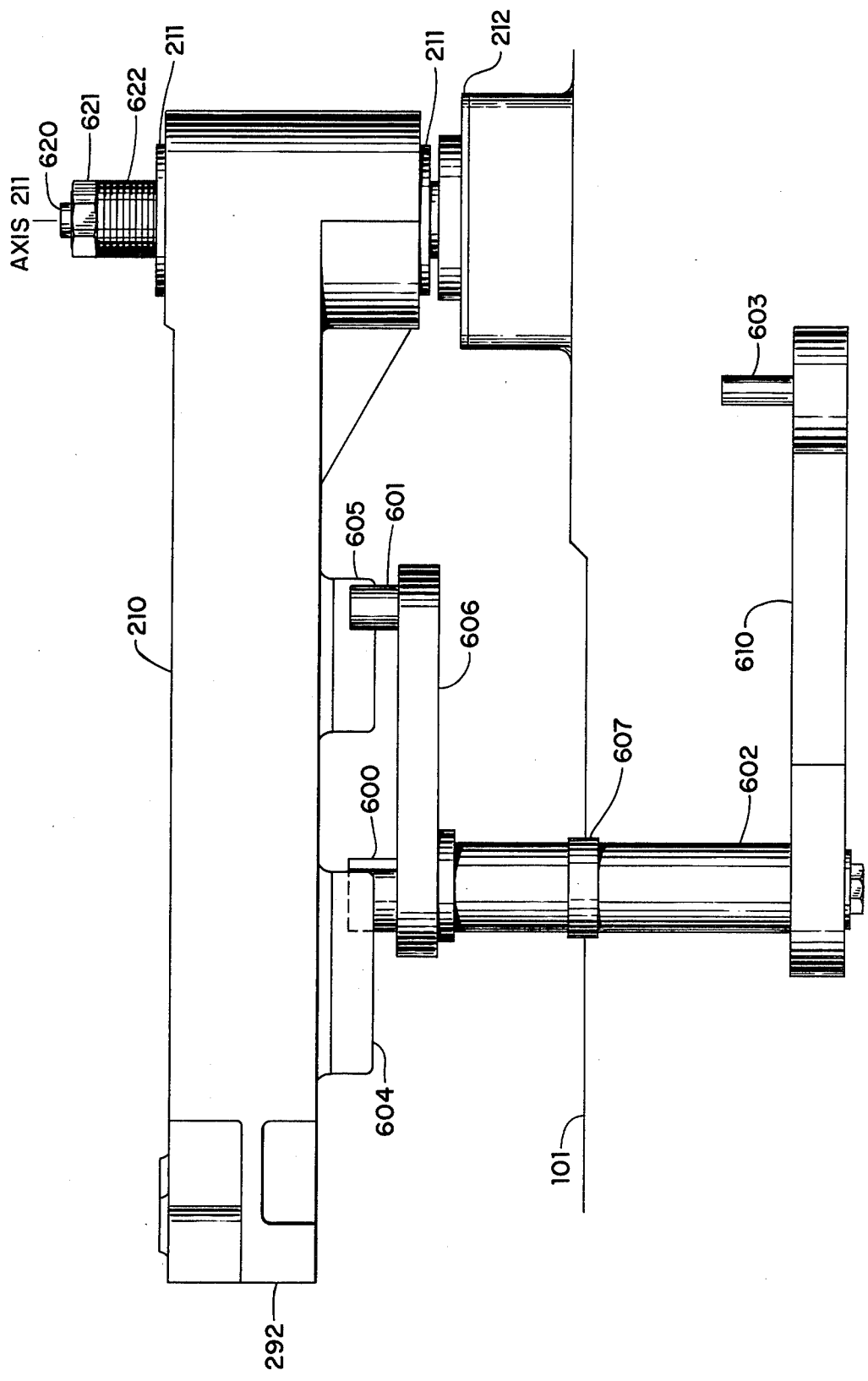
FIG. 6 is a schematic illustration of pivotable arm structure and manually operable pivot arm control structure employed in the magnetic disc memory apparatus.

Referring to FIG. 6, pivotable arm 210 connects by way of bearings 211, pin 620, nut 621, spring 622 and shim or washer structure 212 to a portion of base 100 designated 101. In addition, there may be other pieces of structure internal to arm 210 and base 100 (and thus not shown) which are added to each other to make up the overall pivotable arm pivot axis length. Each dimension, if a shimming procedure was not used, would have to be precisely machined. The dimensions of each piece of structure are chosen so that, in the preferred embodiment of the present invention, shimming is always needed. The shims or washer are insertable one upon the other to adjust the position of pivotable arm 210 relative to base portion 101. This adjustment permits the carriage arm and therefore the magnetic head structure to be easily and precisely set.

Motion of pivotable arm 210 is into and out of the plane of the drawing about axis 211. Interacting surface 292 is at the end of the pivot arm opposite pivotable axis 211, and is the surface for interacting with band-coupling earlier described. Extending or protruding downwardly or in a direction towards base portion 101, are two tabs 604 and 605.

Also shown in FIG. 6 is a rotatably mounted pivotable arm control 606. The rotatable mount on base portion 101 is shown at 607. Stops 601 and 600 are shown protruding up from carriage arm control 606 in a manner designed to engage tab 604 on one side thereof and tab 605 on an opposite side thereof. Shaft 602, rotatably mounted at 607, rotates upon manual application of force at or near protuberance 603 in directions into or out of the plane of the drawing. The connecting structure 610 between protuberance 603 and shaft 602 is springy or flexible to permit application of a torsion force on shaft 602 when protuberance 603 is mated into certain apertures in the base, to be described below. Protuberance 603 and its connecting structure up to mount 607 is external to the sealed housing of the disc drive.

Figure 7A:
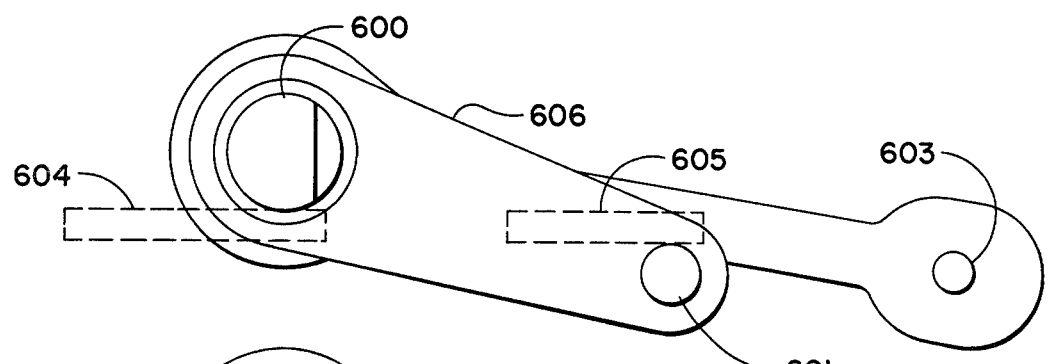
FIG. 7a and 7b are schematic representations of the manually operable pivotable arm control from a view in the same direction as FIG. 2, showing its multiple position capability.
Figure 7B:
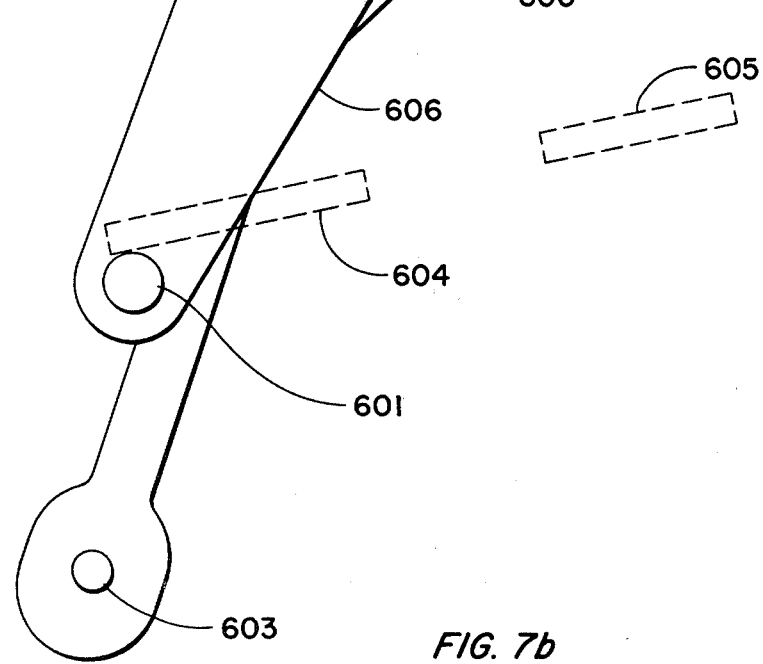

Prior to referring to FIG. 7a and FIG. 7b, allocation of disc surface area should be reviewed. In the present invention, the magnetic heads are two per disc surface, (and can have two usable surfaces per disc), the heads being separated from each other and disposed along a radial line of the disc. Thus, directing this discussion to only one disc surface for clarity of illustration, there are two separated "bands" of concentric tracks on the disc surface, that are utilized for recording digital information. The inner band has its "landing zone" including its "landing track" adjacent its innermost track, and the outer band has its "landing zone" including its "landing track" in the separation between the two bands. The landing zones are track areas on the disc surface that are not used for recording digital information, where the magnetic heads are thus permitted to make physical contact ("land"), when the disc is not spinning. Near the inner periphery of, but just outside of, each band, there is a track designated as "home" (or the home track), which is the reference position referred to earlier in the discussion of the home switch and protuberance 130.

Referring, then, to FIGS. 7a and 7b, schematic views of the operation of the control arm of FIG. 6 are shown, the views being taken in the direction of shaft 602. In FIG. 7a, control 606 is shown locked in the landing zone(s) position. Protuberance 603 is restrained by an aperture (not shown) in the base, and causes tension to be applied via flexible structure 610 and stops 600 and 601 against tabs 604 and 605 respectively. Carriage arm 210 (and thus the magnetic heads attached thereto) being attached to tabs 604 and 605, are thus locked in this position. In this position the magnetic heads are in their respective landing zones and lie in their respective landing tracks. The landing tracks are chosen so that when the magnetic heads are on these tracks, they will have no influence upon any ring of either band.

The landing track is thus another reference track, and is actually the reference from which its respective home track is determined, by counting a predetermined number of tracks and setting the home transducer and protuberance 130 accordingly. Thus the machining of both the round portion of stop 600 and tab 604 is critical, since these components essentially control the location of the landing track, as shown in FIG. 7a, FIG. 7a also shows the locked position in which the apparatus is shipped, since the heads and the disc can do no severe damage to each other in this position.

Referring to FIG. 7b, control 606 is shown rotated to its operating position, and again locked by protuberance 603 in conjunction with another aperture in the base. In this position, tab 604 (and thus the carriage arm) has a range of motion from stop 601 (and is shown touching stop 601) to the "flat" or "relief" of stop 600. These stops now present travel "crash-limits" for the magnetic heads. These prevent movement of the carriage arm to harmful extremes that could cause damage, (e.g. off the surface of the disc or against the central shaft). These limits can be chosen so that the magnetic head normally associated with one band does not travel across the central landing zone between the bands to the other band, although another, rubberized, "soft-stop" (not shown) is provided for this purpose.

It should be appreciated that in the factory, prior to shipment, control 606 is used to move the pivotable arm into the locked position shown in FIG. 7a. Movement and locking of the carriage arm and the accompanying magnetic heads to this position is a convenient and reliable way to establish the landing track(s), from which the home track(s) is referenced.

Figure 8:
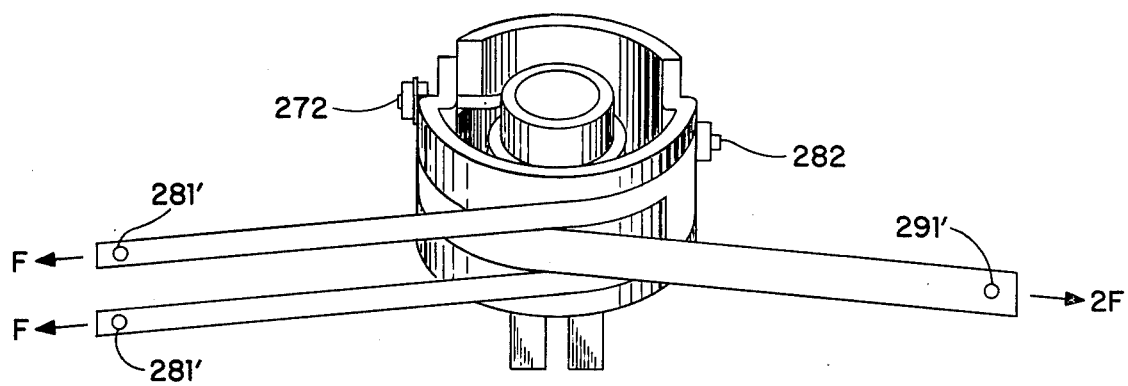
FIG. 8 depicts an alternative embodiment of the band coupling arrangement of the memory apparatus described herein.

Next, with regard to FIG. 8, an isometric view of an alternative embodiment to the band coupling device is depicted. Referring back to FIG. 3, the two metal bands as shown in an edge view are not defined to have any specific configuration, but, in the preferred embodiment are two separate generally rectangular metal bands. However, in FIG. 8, a configuration is depicted, which is designed to prevent torqueing effects, since the forces (2F=F+F) are symmetrically or evenly distributed. In FIG. 3, with the overlapping separate rectangular band arrangement, where band 290 is intended to be depicted as lying above or higher than band 280, application of force on these bands by spring 270 creates torque, however minimal, which would tend to cause the portion of pulley 271 near spring tip 272 to be elevated from the plane of the drawing and tend to cause the portion of pulley 271 near fixed mount 282 to be depressed into the plane of the drawing. This effect proved to be of minimal concern in the apparatus of the present invention, and did not adversely affect operation of the present invention. But, for other embodiments of the present invention where such torqueing might be a coupling problem, FIG. 8 depicts a solution. The configuration of FIG. 8, where hole 291' is adapted to receive fixed connection 291 and aperture 272' (not shown) is adapted to receive spring end 272, where holes 281' are adapted to receive supports 281 and hole 282' (not shown) is adapted to receive support 282, generates symmetrical forces as shown where unwanted torque effects are not permitted.

Figure 9:
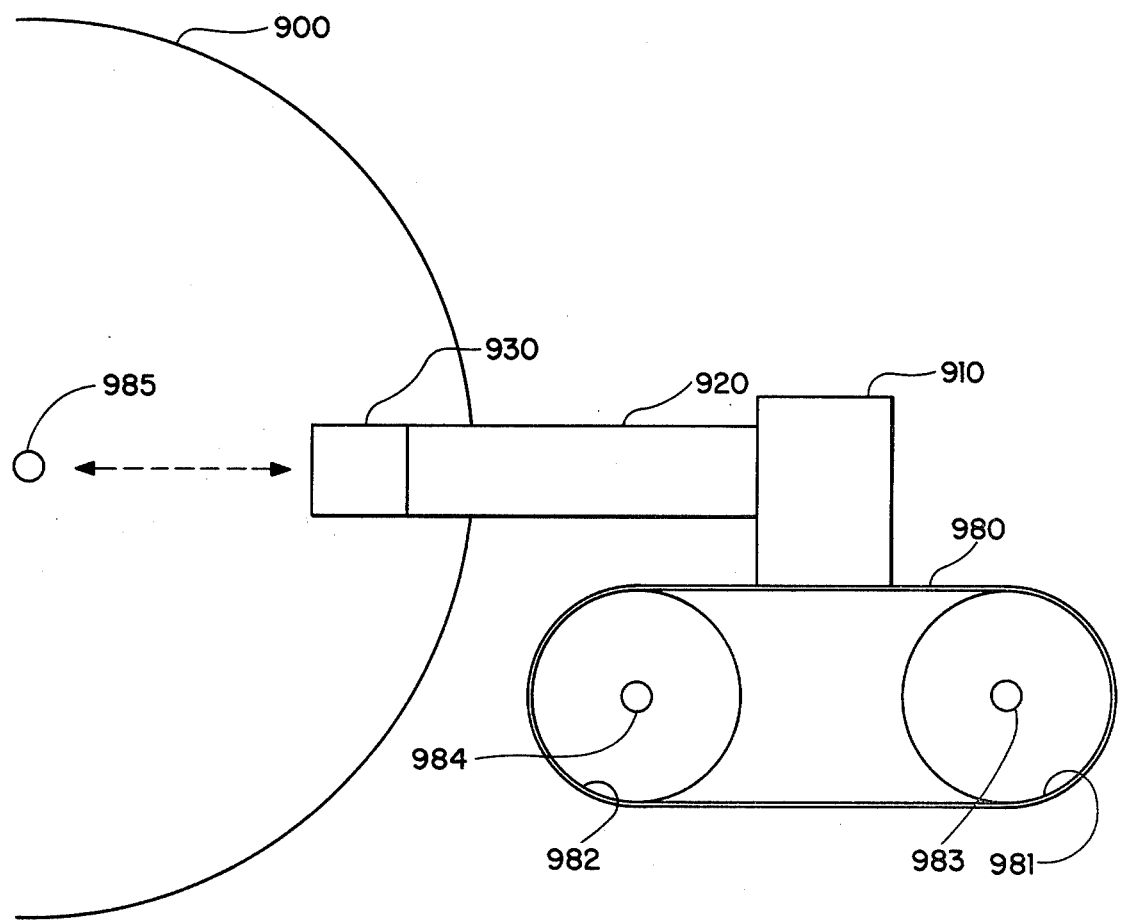
FIG. 9 depicts another alternative embodiment of the band coupling and magnetic head support arm apparatus of the magnetic disc memory structure disclosed herein.

In FIG. 9, a schematic, alternative embodiment of the support arm for the magnetic heads, and structure for moving the magnetic heads relative to the rotating magnetic disc is shown. Endless metal band or closed loop band 980, shown on edge is tautly wrapped (and can be spring biased to achieve tautness) around two pulleys 981 and 982. (Alternatively, the band need not be closed on itself as long as it is tautly wrapped.) One of these pulleys, for example, 981, is driven by stepper motor 120. Structure 910 is fixedly connected to band 980 as shown, from which structure 920 is cantilevered. Magnetic heads shown generally at 930, are linearly translated by virtue of the stepping motor movement in a radial direction adjacent spinning magnetic disc 900. This alternative embodiment does not show bearing and guide rails and similer structure normally used for supporting structure 910, in order to improve clarity of presentation. However, FIG. 9 does illustrate that even with use of a stepping motor, motion of the magnetic heads relative to the surface of the spinning disc need not be curvilinear or circular but can, in fact, be linear and radial. Axis 985 can be, but need not be parallel to axis 983 and 984. (U.S. Pat. No. 3,946,439 shows a similar, but different, construction as applied to floppy discs, where disc contact is essential.)

Next, with regard to FIGS. 10a, 10b, and 10c, the optical transducer system used for measuring angular displacement of the rigid magnetic disc from a fixed reference is shown. FIGS. 10a and 10b show how the transducer would be inserted and FIG. 10c shows its rotated and locked positions. Upright member 268 is shown supporting optical transducer 261 in proper alignment with toothed or apertured optical mask 250 (rotatably mounted around axis 201). The optical transmitting and receiving devices are contained within transducer 261 above and below mask 250. The upright member 268 is supported on lip or base lip 262, which is apertured as shown by apertures 266 and 263. At extremeties of these respective apertures, keying holes 265 and 264 are shown asymmetrically displaced (these keying holes do not lie on a line of symmetry of this base lip structure) in order to prevent 180° mis-alignment. A ring 100a of base structure 100 is shown in FIG. 10b with aperture 160 adapted to receive optical assembly 260. Mating screws 161 and 162 are positioned to receive keying holes 265 and 264 respectively and thereupon rotational motion about center 267 will properly align optical structure 260 relative to mask 250 by the sliding of mating screws 161 and 162 along the periphery of apertures 266 and 263. This motion essentially swings the optical head about the edge of mask 250, without contact or damage. The density of other components in this vicinity is high, and visibility is limited; thus, if the keying arrangement were not provided, mis-insertion could cause damage to the optical heads. The rest position or the orientation position, when the optical transducer is properly aligned, occurs when apertures 269 and 269' line up with screw holes 270, into which screws (not shown) are tightened to secure the transducer apparatus in place.

Figure 11:
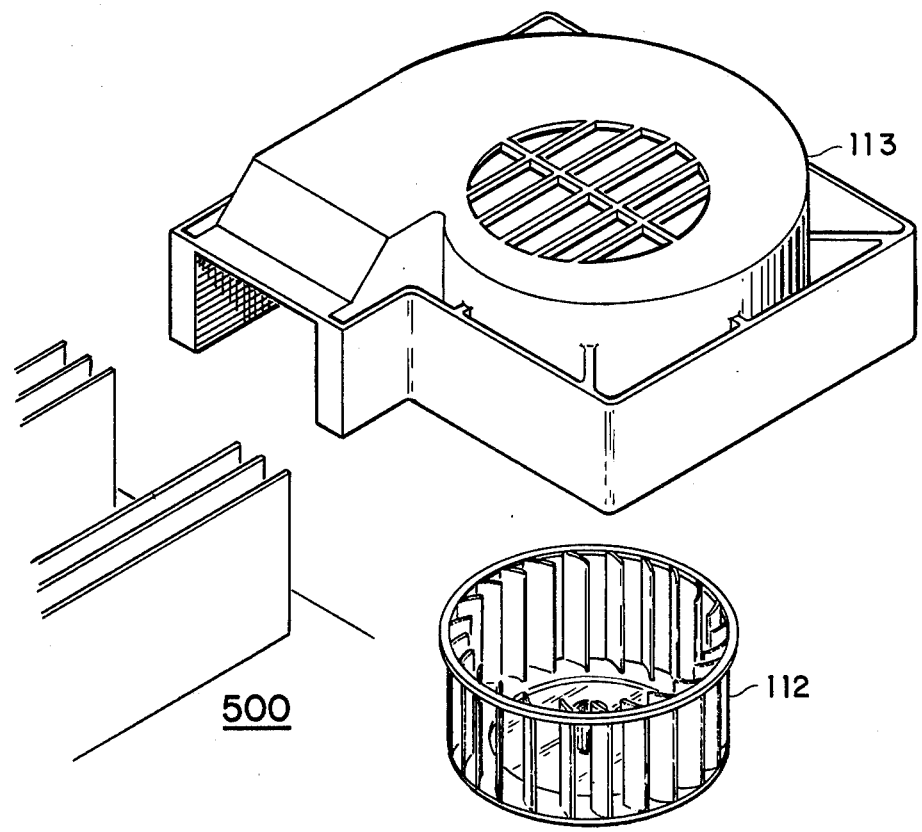
FIG. 11 is an exploded representation of the constant speed motor which drives the spinning magnetic disc, and fan blades and duct work associated therewith, to obtain a cooling effect for other components in magnetic memory apparatus described herein.
Figure 11:
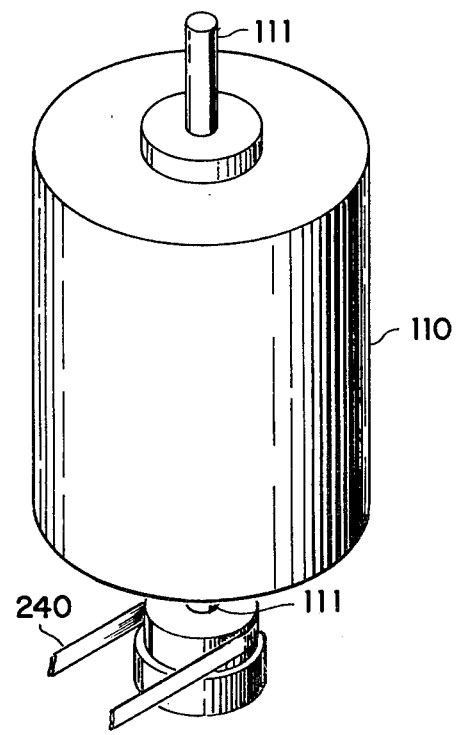

Referring next to exploded isometric FIG. 11, constant speed motor 110 of FIG. 2 is shown with shaft 111 protruding therefrom at both ends. As noted earlier, shaft 111 is mechanically linked with drive belt 240 which causes pivotable motion of shaft 201 and therefore pivotable motion of magnetic disc 200. However, availability of this rotary motion external to the sealed enclosure but within the chassis of the memory apparatus is further employed to accomplish another separate and distinct operational function is a synergistically efficient manner. Shaft 111 is coupled to draft structure, such as for example fan blades 112, which creates draft or flow of ambient air external to disc drive enclosure or base 100, but within the chassis of the overall memory apparatus system. This ambient air flow is channeled by air directional structure 113 in a desired direction to permit cooling of electronic and other components employed within the overall memory apparatus system. (It should be understood that a disc drive system employs electronic circuitry 500 such as power supplies, amplifiers, and other circuitry external to the enclosed disc, as suggested in FIG. 11 and which require cooling.)

The constant speed motor is a single phase AC induction motor with equivalent inertial load of about 23 lb. in$^2$ and viscous load torque of about 1.4 in lb. at a speed at 3840 RPM, and in this particular instance is manufactured by Robins and Meyers Company. There is extra motor power available to run the cooling apparatus, since less than full power is used by the disc when running at operating speed; the extra motor power is needed when disc speed is being increased from zero to operating speed.

Referring to all figures in concert, the present invention may be embodied in yet other specific forms without departing from the spirit or essential characteristics thereof. Alternative embodiments of the band coupling device and the magnetic heads supporting apparatus have been shown. The optical mask could be a slotted disc or some other apertured mask apparatus; in fact, the transducer system need not be optical and for example could be magnetic, employing permanent magnets and pick up coils where the same mis-alignment problem would have to be solved. The coupling bands need not be metal, but could be made from other material, plastic, for example. However, temperature compensation might not be achieved, even if the magnetic head support was also made of the same plastic, and reliability would suffer. The duct work of the cooling apparatus can be multi-directional.

The present embodiments are therefore to be considered in all respects as illustrative and restrictive. The scope of the invention is indicated by the appended claims rather than by the foregoing description, and all changes which come within the meaning and range of equivalency of the claims are therefore intended to be embraced therein.

What is claimed is:

1. In memory apparatus supported by a base and intended for use in a digital computer system, said apparatus comprising at least one spinable and rigid magnetic disc for recording digital information, magnetic head means for reading said information from and writing said information into said disc; positioning means for accurately positioning said magnetic head means parallel and adjacent to the plane of said disc; said positioning means comprising:

supporting means movably mounted on said base and movable in directions parallel to and perpendicular to the plane of said disc for supporting said magnetic head means in an initial position offset perpendicularly from said plane of said disc;

stepper motor means including a stepper motor mounted on said base responsive to electrical signals from said computer system for providing mechanical step motion;

inelastic, taut band means for coupling said step motion to said movably mounted supporting means in the direction parallel to the plane of said disc, whereby said head means is stepped along said disc surface; and shim means for displacing said supporting means in the direction perpendicular to the plan e of said disc to accurately adjust the adjacent relationship between said magnetic head means and said disc to a predetermined final position.

2. The positioning means of claim 1 and wherein said movably mounted supporting means includes means for being translationally mounted.

3. The positioning means of claim 1 and wherein said stepper motor is a rotational stepper motor rotatably mounted to said base, said rotational stepper motor having rotational shaft means.

4. The positioning means of claim 2 and wherein said stepper motor is a rotational stepper motor rotatably mounted to said base, said rotational stepper motor having rotational shaft means.

5. The positioning means of claim 4 and wherein said band means comprises:

rotatable pulley means rotatably mounted to said base;

means for orienting the axis of rotation of said rotational stepper motor parallel to the axis of rotation of said pulley means; and an endless band tightly coupled around said pulley and said shaft, whereby step-rotational motion of said rotational step motor causes said band to move.

6. The positioning means of claim 3 and wherein said stepper motor means further includes viscously-coupled inertia damping means mounted around said shaft for providing viscously-coupled inertia damping of the step-rotating motion of said shaft.

7. The positioning means of claim 6 and wherein said damping means comprises a hermetically-sealed and internally-cylindrical enclosure formed with an axially-located hollow for receiving said shaft therein, said enclosure containing viscous fluid and an axially-apertured, rotatably-mounted metal slug matingly shaped with the interior of said enclosure, said slug arranged to rotate within said enclosure through and with said fluid and about said rotation axis.

8. The positioning means of claim 1 and wherein said movably mounted supporting means includes means for being pivotably mounted.

9. The positioning means of claim 8 and wherein said stepper motor is a rotational stepper motor rotatably mounted to said base, said rotational stepper motor having rotational shaft means for driving said pivotably mounted means.

* * * * *